United States Patent Office 3,010,972
Patented Nov. 28, 1961

3,010,972
CONDENSED CYCLOPROPYL AMINE DERIVATIVES
Carl Kaiser, Haddon Heights, N.J., and Charles L. Zirkle, Berwyn, Pa., assignors to Smith, Kline & French Laboratories, Philadelphia, Pa., a corporation of Pennsylvania
No Drawing. Filed Mar. 18, 1960, Ser. No. 15,808
6 Claims. (Cl. 260—330.5)

This invention relates to novel ring condensed cyclopropyl amine derivatives specifically 1-aminocycloprop-[a]indenes, 1-aminocyclopropa[b]benzofurans and 1-aminocyclopropa[b]thianaphthenes having valuable pharmacodynamic activity.

More specifically the compounds of this invention alter or modify the central nervous system and are particularly useful in the animal organism as antidepressant, ataractic and hypotensive agents. Certain of these compounds possess the valuable characteristic, rapid onset of action. The compounds of this invention further exhibit potent monoamine oxidase inhibitory properties which are associated with antidepressant activity.

The new 1-aminocycloprop[a]indenes, 1-aminocyclopropa[b]benzolfurans and 1 - aminocyclopropa[b]thianaphthenes of this invention are represented by the following structural formula:

FORMULA I

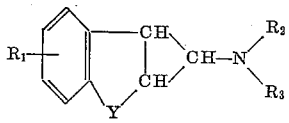

when:

Y represents $CH_2$, O, S or $SO_2$;

$R_1$ represents hydrogen, chloro, bromo, fluoro, trifluoromethyl, methyl or methoxy; and $R_2$ and $R_3$ represent hydrogen, lower alkyl or, when taken together with N, piperidino, N-pyrrolidinyl or morpholino.

By the term "lower alkyl" where used herein groups having from 1 to 4, preferably 1 to 2, carbon atoms are indicated.

Advantageous compounds of this invention are represented by the following structural formula:

FORMULA II

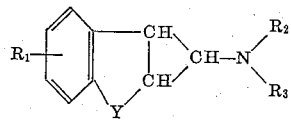

when:

Y represents $CH_2$, O, S or $SO_2$;

$R_1$ represents hydrogen, chloro or trifluoromethyl in positions 3 or 4; and $R_2$ and $R_3$ represent hydrogen, methyl or, when taken together with N, piperidino.

A particularly advantageous and useful compound of this invention is 1-amino-1,1a,6,6a-tetrahydrocycloprop-[a]indene.

This invention also includes nontoxic, pharmaceutically acceptable, acid addition salts of the above defined bases formed with organic and inorganic acids. Such salts are easily prepared by methods known to the art. The base is reacted with either the stoichiometric amount of organic or inorganic acid in aqueous miscible solvent, such as acetone or ethanol, with isolation of the salt by concentration and cooling or an excess of the acid in aqueous immiscible solvent, such as ethyl ether or chloroform, with the desired salt separating directly. Exemplary of such organic salts are those with maleic, fumaric, benzoic, ascorbic, pamoic, succinic, bismethylene-salicylic, methanesulfonic, ethanedisulfonic, acetic, propionic, tartaric, salicylic, citric, gluconic, lactic, malic, mandelic, cinnamic, citraconic, aspartic, stearic, palmitic, itaconic, glycolic, p-aminobenzoic, glutamic, benzenesulfonic and theophylline acetic acids as well as with the 8-halotheophyllines for example, 8-chlorotheophylline and 8-bromotheophylline. Exemplary of such inorganic salts are those with hydrochloric, hydrobromic, sulfuric, sulfamic, phosphoric and nitric acids. These salts may also be prepared by the classical method of double decomposition of appropriate salts which is well-known to the art.

The compounds of this invention are prepared according to the following synthetic procedure:

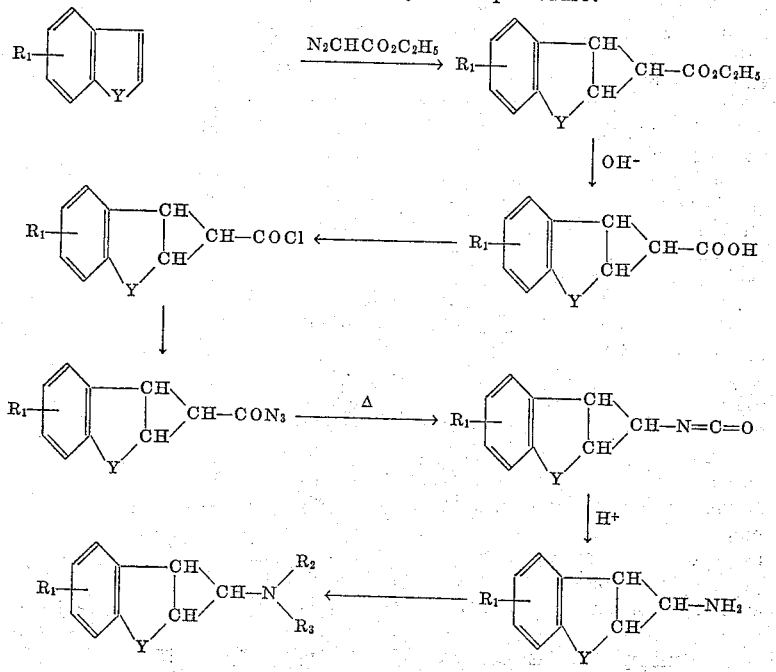

The terms Y, Y₁, R₂ and R₃ are as previously defined.

The properly substituted indene, benzofuran or thianaphthene starting material is reacted with at least one molar equivalent of ethyl diazoacetate at elevated temperature, preferably at the reflux temperature of the mixture. The resulting ethyl 1-cycloprop[a]indenecarboxylate or the corresponding benzofuran or thianaphthene compound is hydrolyzed with an alkali metal hydroxide such as potassium or sodium hydroxide to give the carboxylic acid. Treatment of this carboxylic acid with a chlorinating agent such as phosphorus trichloride, phosphorus pentachloride or, preferably, thionyl chloride yields the corresponding carbonyl chloride.

The carbonyl chloride in an inert, water soluble, organic solvent such as acetone, tetrahydrofuran or dioxane is cooled to about 0–15° C. and treated with an excess of sodium azide in cold aqueous solution. Extraction with a water-immiscible, organic solvent such as ether or benzene and concentration of the extracts yields the carbonyl azide. Heating the azide with an organic solvent such as toluene or xylene at 90–100° C. for about 30 to 90 minutes and concentrating the mixture gives the isocyanate.

Treating the isocyanate with concentrated hydrochloric acid at elevated temperature, conveniently at the reflux temperature for about 5–15 hours gives, upon concentration, the 1-amino-1,1a,6,6a-tetrahydrocycloprop[a]indene hydrochloride or the corresponding benzofuran or thianaphthene compounds of this invention i.e. the 1-amino-1a,6a-dihydro-1H-cyclopropa[b]benzofuran hydrochloride or the 1-amino-1a,6a-dihydro-1H-cyclopropa[b]thianaphthene hydrochloride. The free base is obtained by dissolving the hydrochloride salt in water, neutralizing with an alkali metal hydroxide or carbonate such as sodium hydroxide or potassium carbonate and extracting with a water-immiscible, organic solvent such as ether or chloroform. Evaporation of the solvent from the extracts gives the 1-amino-1,1a,6,6a-tetrahydrocycloprop[a]indenes, 1 - amino - 1a,6a - dihydro - 1H-cyclopropa[b]benzofurans and 1-amino-1a,6a-dihydro-1H-cyclopropa[b]thianaphthenes of this invention.

Alkylation of the amino group to prepare further compounds of this invention is accomplished in several ways. Monoalkylation is carried out by reacting the primary amino compound with an appropriate aldehyde or ketone in a lower alcohol solvent and catalytically reducing the resulting Schiff base with a catalyst such as palladium-on-charcoal or platinum oxide. The dialkylamino compounds are prepared by reacting the primary amino compound with at least two moles of an alkyl halide, such as a chloride or bromide, in the presence of a base such as an alkali metal hydride or carbonate for example sodium hydride or potassium carbonate.

Monomethylation is conveniently accomplished by refluxing the primary amine with ethyl formate, and refluxing the resulting N-formyl compound with methyl iodide and a basic adjuvant such as an alkali metal hydride for example sodium hydride. The dimethylamino derivatives are obtained by treating the primary amine with a mixture of aqueous formaldehyde and formic acid.

To obtain the piperidino, N-pyrrolidinyl or morpholino compounds of this invention, the primary amine is heated with at least a molar equivalent of a polymethylene dihalide or a bis(β-dihaloethyl)ether and an acid binding agent such as pyridine or an alkali metal carbonate such as potassium or sodium carbonate.

The substituted indene, benzofuran and thianaphthene starting materials (III) are either known to the art or are prepared by the following procedures:

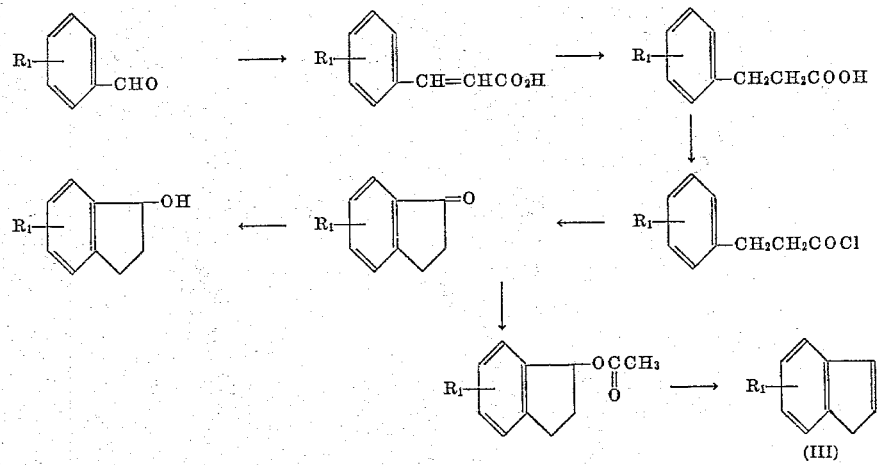

(III)

The substituted benzaldehyde is reacted with acetic anhydride and sodium acetate according to the Perkin condensation procedure; the resulting cinnamic acid is hydrogenated in the presence of a platinum oxide catalyst; the acid is treated with a chlorinating agent such as thionyl chloride; the acid chloride is cyclized by treating with aluminum chloride; the resulting ketoindane is hydrogenated to give the hydroxyindane compound; the hydroxyindane is reacted with acetic anhydride and the resulting ester is converted by pyrolysis to the indene starting material.

The benzofuran starting materials are prepared by reacting an appropriately substituted salicylaldehyde with chloroacetic acid in the presence of an alkali metal hydroxide such as sodium or potassium hydroxide at about 160°–200° C.

The thianaphthene starting materials are prepared by the following procedure:

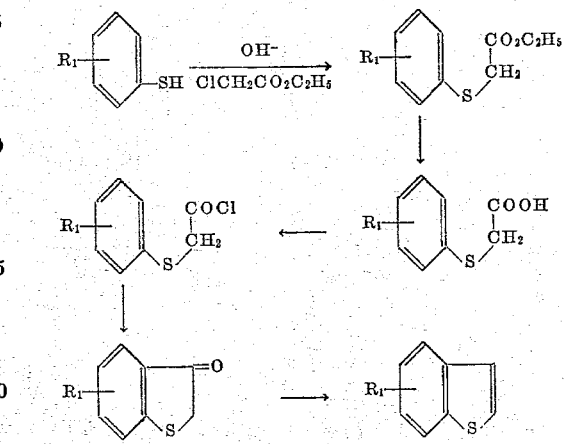

The substituted thiophenol is condensed with ethyl chloroacetate in the presence of a basic adjuvant such as an alkali metal hydroxide for example, sodium or potassium hydroxide; the resulting ethyl ester is hydrolyzed; the acid is chlorinated; the resulting acid chloride is cyclized under Friedel-Crafts conditions with aluminum chloride and dehydrated with zinc-acetic acid to give the thianaphthene starting materials.

The compounds of this invention may be present as cis or trans isomers and also as $d$ or $l$ optical isomers. It is intended to include in this invention all of these isomers, the separated cis and trans isomers and the resolved $d$ and $l$ isomers as well as the mixtures of cis-trans and $d$ $l$ isomers.

The following examples are not limiting but are illustrative of compounds of this invention and will serve to make fully apparent all of the compounds embraced by the general formula given above.

*Example 1*

A cold mixture of 118.2 g. of indene and 121 g. of ethyl diazoacetate is stirred and slowly heated to reflux. The refluxing is continued for four hours. Distillation in vacuo gives ethyl 1,1a,6,6a-tetrahydro-1-cycloprop[a]indenecarboxylate.

A mixture of 56.5 g. of this ester in 300 ml. of ethanol and 33.6 g. of sodium hydroxide in 50 ml. of water is refluxed for nine hours. The solvents are evaporated in vacuo and the residue is dissolved in 500 ml. of water and acidified with concentrated hydrochloric acid. Extraction with ether and evaporation of the extracts yields 1,1a,6,6a-tetrahydro-1-cycloprop[a]indenecarboxylic acid. The acid chloride is obtained by mixing 41 g. of the acid and 111 ml. of thionyl chloride, allowing the mixture to stand for 16 hours at room temperature, concentrating and distilling (B.P. 120–131° C./1.5–3.1 mm.).

The acid chloride (23.5 g.) in 300 ml. of acetone is cooled to 5° C. While stirring, a solution of 15.9 g. of sodium azide in 48 ml. of water is added, keeping the temperature below 13° C. The mixture is stirred for 30 minutes, poured into 1 l. of ice water and extracted with ether. The extracts are concentrated, then treated with 100 ml. of dry toluene and heated at 90–95° C. for one hour. Removal of the solvent gives, as the residue, the isocyanate.

A mixture of 20.7 g. of this isocyanate and 350 ml. of concentrated hydrochloric acid is refluxed for five hours, then concentrated in vacuo. The residue is dissolved in water, and made basic. Extraction with ether and concentration of the extracts gives 1-amino-1,1a,6,6a-tetrahydrocycloprop[a]indene.

An ethanol solution of 1-amino-1,1a,6,6a-tetrahydrocycloprop[a]indene is treated with excess ethereal hydrogen chloride to separate the hydrochloride salt which is recrystallized from ethanol-ether to give crystals melting at 183–184° C.

*Example 2*

A solution of 14.5 g. of 1-amino-1,1a,6,6a-tetrahydrocycloprop[a]indene, prepared as in Example 1, and 100 ml. of ethyl formate is refluxed for 17 hours, then concentrated in vacuo to leave, as the residue, 1-formylamino-1,1a,6,6a-tetrahydrocycloprop[a]indene.

To a stirred solution of 17.3 g. of 1-formylamino-1,1a,6,6a-tetrahydrocycloprop[a]indene in 150 ml. of diethylene glycol dimethyl ether is added 5.2 g. of a 54.5% suspension of sodium hydride in mineral oil. The mixture is refluxed for two hours, then cooled and treated with an additional 5.2 g. of sodium hydride suspension. Refluxing is continued for two hours, then 87 ml. of methyl iodide is added. The mixture is allowed to stand at room temperature for 16 hours, then refluxed for 12 hours. The mixture is filtered and concentrated and the residue is poured into one liter of ice water. Extraction with methylene chloride and evaporation of the extracts gives 1,1a,6,6a-tetrahydro-1-(N-methyl-N-formyl)aminocycloprop[a]indene.

Refluxing the above prepared N-formyl compound with 150 ml. of 37% hydrochloric acid, washing with ether, concentrating, dissolving the residue in water, basifying with sodium hydroxide solution, extracting with ether and evaporating the ether extracts gives, as the residue 1,1a,6,6a-tetrahydro-1-methylaminocycloprop[a]indene.

The maleate salt is prepared by treating an ethyl acetate solution of the base with a molar equivalent amount of maleic acid in ethyl acetate.

*Example 3*

A mixture of 6.0 g. of 1-amino-1,1a,6,6a-tetrahydrocycloprop[a]indene (prepared as in Example 1), 10 ml. of 40% aqueous formaldehyde and 15 ml. of 90% formic acid is refluxed for 18 hours. The cooled reaction mixture is treated with 5.5 ml. of concentrated hydrochloric acid and the solution is evaporated in vacuo. The residue is made alkaline with potassium hydroxide and extracted with ether. The extracts are evaporated to give 1,1a,6,6a, - tetrahydro - 1 - dimethylaminocycloprop[a]indene.

An ethanol solution of the free base is treated with an excess of ethereal hydrogen chloride to yield the hydrochloride salt.

*Example 4*

A mixture of 30.0 g. of 5-chloroindene and 24.0 g. of ethyl diazoacetate is refluxed for four hours, then distilled to give ethyl 3-chloro-1,1a,6,6a-tetrahydro-1-cycloprop[a]indenecarboxylate.

Hydrolyzing this ester by refluxing with sodium hydroxide in aqueous ethanol for eight hours and working up as in Example 1 gives 3-chloro-1,1a,6,6a-tetrahydro-1-cycloprop[a]indenecarboxylic acid which is treated with excess thionyl chloride at room temperature to give, after concentrating and distilling, the acid chloride.

Twenty-seven grams of the acid chloride in 250 ml. of acetone is treated with 16.0 g. of sodium azide in aqueous solution, keeping the temperature at 5–10° C. Pouring the mixture into ice water, extracting with ether, concentrating the extracts and heating the residue in toluene at 90° C. for one hour gives, after evaporation of the solvent, the corresponding isocyanate.

Refluxing this isocyanate with 300 ml. of concentrated hydrochloric acid for five hours and working up as in Example 1 gives 1-amino-3-chloro-1,1a,6,6a-tetrahydrocycloprop[a]indene.

An ethanol solution of the free base is treated with excess hydrogen chloride in ether solution to give the hydrochloride salt.

*Example 5*

Refluxing a mixture of 13.0 g. of 6-methylindene and 12.0 g. of ethyl diazoacetate for four hours and distilling in vacuo furnishes ethyl 1,1a,6,6a-tetrahydro-4-methyl-1-cycloprop[a]indenecarboxylate which is hydrolyzed by refluxing with sodium hydroxide in aqueous ethanol to give 1,1a,6,6a-tetrahydro-4-methyl-1-cycloprop[a]indenecarboxylic acid.

Treatment of this carboxylic acid with excess thionyl chloride furnishes the acid chloride which is reacted with sodium azide and then heated in toluene to yield the isocyanate.

A mixture of 6.8 g. of the isocyanate and 100 ml. of concentrated hydrochloric acid is refluxed for five hours. The mixture is concentrated in vacuo. The residue is dissolved in water and made basic with sodium hydroxide. Extraction with ether and removal of the ether from the extracts leaves 1-amino-1,1a,6,6a-tetrahydro-4-methylcycloprop[a]indene.

A solution of 1.0 g. of the free base in 50 ml. of ether is treated with excess tartaric acid. Filtration gives the tartrate salt.

*Example 6*

A mixture of 28.0 g. of 5-methoxyindene and 23.0 g. of ethyl diazoacetate is heated at reflux for five hours and then distilled to give ethyl 1,1a,6,6a-tetrahydro-3-methoxy-1-cycloprop[a]indenecarboxylate.

Twenty grams of the above prepared ester is refluxed with 16.0 g. of sodium hydroxide in aqueous ethanol for ten hours. Working up as in Example 1 gives 1,1a,6,6a-tetrahydro- 3 -methoxy - 1 - cycloprop[a]indenecarboxylic acid which is treated with 50 ml. of thionyl chloride, and the resulting mixture distilled to give 1,1a,6,6a-tetrahydro-3-methoxy-1-cycloprop[a]indenecarbonyl chloride.

Treating this acid chloride with 18.0 g. of sodium azide at 10° C. and heating the resulting carbonyl azide with dry toluene at 90° C. for one hour gives the corresponding isocyanate.

This isocyanate (15.0 g.) is heated at reflux with 250 ml. of concentrated hydrochloric acid for five hours. Working up as in Example 5 gives 1-amino-1,1a,6,6a-tetrahydro-3-methoxycycloprop[a]indene.

The free base (1.0 g.) in ethanol solution is treated with an excess of ethereal hydrogen bromide to separate the hydrobromide salt.

Example 7

A mixture of 1.7 g. of 1-amino-1,1a,6,6a-tetrahydro-3-methoxy-cycloprop[a]indene (prepared as in Example 6), 3.0 g. of n-butyl bromide, 5.0 g. of potassium carbonate and 60 ml. of toluene is heated at reflux for ten hours. The cooled reaction mixture is poured into water and the toluene layer is separated. Evaporation of the toluene in vacuo yields a residue which is treated with acetic anhydride on a steam bath for 30 minutes. Excess acetic anhydride is removed in vacuo and the residue is taken up in ether. The ether solution is extracted with aqueous hydrochloric acid. The extract is basified and extracted with ether. Evaporation of the ether gives, as the residue, 1-dibutylamino - 1,1a,6,6a - tetrahydro - 3 - methoxycycloprop[a]indene.

Example 8

Treatment of 17.6 g. of 1a,6a - dihydro - 1H - cyclopropa[b]benzofuran-1-carboxylic acid with 50 ml. of thionyl chloride at room temperature for 16 hours and distillation gives the acid chloride which is reacted with sodium azide (15.0 g.) in acetone-water at 10° C. Heating the resulting carbonyl azide in toluene gives the corresponding isocyanate.

This isocyanate (8.5 g.) is refluxed with 150 ml. of concentrated hydrochloric acid. The mixture is concentrated in vacuo and the residue is dissolved in water, made basic and extracted with ether. Evaporation of the solvent from the extract gives 1 - amino - 1a,6a - dihydro - 1H - cyclopropa[b]benzofuran.

Dissolving the free base in ethanol and treating with an excess of ethereal hydrogen chloride gives the hydrochloride salt.

Example 9

A mixture of 14.7 g. of 1-amino-1a,6a-dihydro-1H-cyclopropa[b]benzofuran (prepared as in Example 8), 22.9 g. of 1,5-dibromopentane and 30.0 g. of potassium carbonate in 200 ml. of xylene is refluxed for 14 hours. The cooled reaction mixture is treated with water. The xylene layer is separated and evaporated in vacuo to leave, as the residue, 1a,6a - dihydro - 1 - piperidino - 1H - cyclopropa[b]benzofuran.

A solution of the free base (1.0 g.) in 50 ml. of ether is reacted with an excess of glacial acetic acid to yield the acetate salt.

Example 10

5-chlorobenzofuran (15.2 g.) and 12.0 g. of ethyl diazoacetate are refluxed for four hours. Distillation gives ethyl 3-chloro - 1a,6a - dihydro-1H-cyclopropa[a]benzofuran-1-carboxylate.

Hydrolysis of this ester by refluxing with sodium hydroxide and chlorination of the resulting acid with thionyl chloride gives 3 - chloro - 1a,6a - dihydro - 1H - cyclopropa[b]benzofuran-1-carbonyl chloride.

A cold solution of 11.8 g. of the above prepared acid chloride in 125 ml. of acetone is treated with an aqueous solution of 8.0 g. of sodium azide keeping the temperature below 13° C. The mixture is stirred for 30 minutes, then poured into 1 liter of ice water and extracted with ether. The extracts are dried, concentrated and heated with 50 ml. of toluene at 90° C. for one hour. Removal of the solvents in vacuo gives 1-amino-3-chloro-1a,6a-dihydro-1-cyclopropa[b]benzofuran.

Treatment of an ethanol solution of the free base with an excess of ethereal hydrogen chloride separates the hydrochloride salt.

Example 11

A mixture of 14.8 g. of 7-methoxybenzofuran and 12.0 g. of ethyl diazoacetate is refluxed for four hours and then distilled to give ethyl 1a,6a - dihydro - 5 - methoxy - 1H - cyclopropa[b]benzofuran-1-carboxylate.

Ten grams of this ester in 60 ml. of ethanol and 8 g. of sodium hydroxide in 15 ml. of water are heated at reflux for nine hours. Working up as in Example 1 gives the carboxylic acid. Treating this acid with 30 ml. of thionyl chloride at room temperature for 16 hours and then distilling gives 1a,6a - dihydro - 5 - methoxy - 1H - cyclopropa[b]benzofuran-1-carbonyl chloride.

An acetone solution of this acid chloride (5.0 g.) is treated with 4.0 g. of sodium azide in aqueous solution at 5–13° C. Working up as in Example 10 and heating the resulting carbonyl azide with toluene gives, after removal of the toluene, the corresponding isocyanate.

Refluxing 2.1 g. of this isocyanate with 35 ml. of concentrated hydrochloric acid for five hours, evaporating, dissolving the residue in water, basifying, extracting with ether and evaporating the extract gives 1-amino-1a,6a-dihydro-5-methoxy-1H-cyclopropa[b]benzofuran.

An ethyl acetate solution of the free base is treated with an equal molar amount of maleic acid to give, upon concentration and cooling, the maleate salt.

Example 12

A mixture of 38.4 g. of 1a,6a-dihydro-1H-cyclopropa[b]thianaphthene-1-carboxylic acid and 100 ml. of thionyl chloride is allowed to stand for 16 hours and then distilled to give the carbonyl chloride. Treatment of this acid chloride in acetone solution with 30.0 g. of sodium azide in water at 10° C. gives the carbonyl azide. The isocyanate is prepared by heating this carbonyl azide in dry toluene at 90–95° C. for one hour and removing the solvent in vacuo.

A mixture of 20.0 g. of the above prepared isocyanate and 300 ml. of concentrated hydrochloric acid is refluxed for five hours. Concentrating in vacuo, dissolving the residue in water, basifying with sodium hydroxide, extracting with ether and removing the ether from the extract gives 1-amino-1a,6a-dihydro-1H-cyclopropa[b]thianaphthene. The free base (1.0 g.) in 75 ml. of ethanol is treated with an excess of ethereal hydrogen chloride to give the hydrochloride salt.

Example 13

5-chlorothianaphthene (16.8 g.) and ethyl diazoacetate (12.0 g.) are heated at reflux for four hours, then distilled to give ethyl 3-chloro-1a,6a-dihydro-1H-cyclopropa[b]thianaphthene-1-carboxylate.

Refluxing this ester (15.0 g.) in 100 ml. of ethanol with 8.0 g. of sodium hydroxide in 20 ml. of water for nine hours and working up as in Example 1 gives 3-chloro - 1a,6a-dihydro-1H-cyclopropa[b]thianaphthene-1-carboxylic acid. Treatment of this acid with 50 ml. of thionyl chloride at room temperature gives the corresponding acid chloride which is reacted with 12 g. of sodium azide. The resulting carbonyl azide is heated in toluene at 90–100° C. for one hour to give the isocyanate.

Refluxing this isocyanate with 200 ml. of concentrated hydrochloric acid and working up as in Example 12 yields 1 - amino - 3-chloro-1a,6a-dihydro-1H-cyclopropa[b]thianaphthene.

An ethanol solution of the free base is treated with excess ethereal hydrogen chloride to give the hydrochloride salt.

Example 14

A mixture of 21.3 g. of 4-bromothianaphthene and 12.0 g. of ethyl diazoacetate is refluxed for four hours. Distillation gives ethyl 2-bromo-1a,6a-dihydro-1H-cyclopropa[b]thianaphthene-1-carboxylate.

Hydrolysis of this ester by refluxing with sodium hydroxide in aqueous ethanol and chlorinating the resulting carboxylic acid with thionyl chloride gives 2-bromo-1a,6a - dihydro - 1H-cyclopropa[b]thionaphthene-1-carbonyl chloride.

A solution of 14.4 g. of this acid chloride in 150 ml. of acetone is cooled to 5° C. and treated with an aqueous solution of 8.0 g. of sodium azide. The resulting mixture is stirred for 30 minutes and worked up as in Example 10 to give the carbonyl azide which is heated in dry toluene for one hour at 90–95° C. to give the isocyanate.

Refluxing this isocyanate (13.4 g.) with 150 ml. of concentrated hydrochloric acid for five hours, then concentrating, dissolving the residue in water, basifying, extracting with ether and evaporating the extract gives 1-amino - 2 - bromo-1a,6a-dihydro-1H-cyclopropa[b]thianaphthene.

Example 15

A mixture of 12.1 g. of 1-amino-2-bromo-1a,6a-dihydro-1H-cyclopropa[b]thianaphthene (prepared as in Example 14), 10.8 g. of 1,4-dibromobutane and 11.0 g. of sodium carbonate in 300 ml. of benzene is heated at reflux for ten hours. The cooled reaction mixture is poured into water and the benzene layer is separated. Upon evaporation of the solvent in vacuo 2-bromo-1a,6a-dihydro - 1-(N-pyrrolidinyl)-1H-cyclopropa[b]thianaphthene is obtained.

A solution of 2.0 g. of the base in ethyl acetate is treated with excess citric acid. Concentration and cooling gives the citrate salt.

Example 16

6-methoxythianaphthene (16.4 g.) and ethyl diazoacetate (12.0 g.) are refluxed together for four hours and then distilled to give ethyl 1a,6a-dihydro-4-methoxy-1H-cyclopropa[b]thianaphthene-1-carboxylate. Refluxing this ester with 12.0 g. of sodium hydroxide in aqueous ethanol for nine hours gives the carboxylic acid which is treated with 40 ml. of thionyl chloride at room temperature for 16 hours to give, upon distillation, 1a,6a-dihydro-4 - methoxy-1H-cyclopropa[b]thianaphthene-1-carbonyl chloride.

The above prepared acid chloride (12.0 g.) is stirred with 7.5 g. of sodium azide in acetone-water at 5–13° C. for 30 minutes. The mixture is poured into ice water and extracted with ether. The extract is concentrated and then treated with dry toluene and heated at 90–95° C. for one hour to give, after removal of the solvent, the corresponding isocyanate.

Refluxing the isocyanate with 100 ml. of concentrated hydrochloric acid and working up as in Example 14 gives 1 - amino -1a,6a-dihydro-4-methyl-1H-cyclopropa[b]thianaphthene.

The hydrochloride salt of this base separates when an ethanol solution of the free base is treated with an excess of ethereal hydrogen chloride.

Example 17

A mixture of 3.9 g. of 1-amino-1a,6a-dihydro-4-methoxy-1H-cyclopropa[b]thianaphthene (prepared as in Example 16), 2.8 g. of bis-($\beta$-chloroethyl)ether, 5.5 g. of potassium carbonate and 75 ml. of xylene is refluxed for 12 hours. Cooling the mixture, pouring it into water and concentrating the xylene mixture in vacuo gives the crude product, 1a,6a-dihydro-4-methoxy-1-morpholino-1H-cycyopropa[b]thianaphthene.

Example 18 p-Trifluoromethylbenzaldehyde (17.4 g.) is heated with a mixture of 55 ml. of acetic anhydride and 8.7 g. of sodium acetate at 170–175° C. for eight hours. The reaction mixture is poured into water and acidified with concentrated hydrochloric acid. The p-trifluoromethylcinnamic acid is filtered off.

Fifteen grams of p-trifluoromethylcinnamic acid is hydrogenated in 100 ml. of absolute ethanol solution with 0.15 g. of platinum oxide at 50 p.s.i. for 7–8 hours at room temperature. The mixture is filtered and concentrated in vacuo to give p-trifluoromethyldihydrocinnamic acid.

Treatment of 12.0 g. of the above prepared acid with 25 ml. of thionyl chloride at room temperature for 16 hours and concentration of the mixture in vacuo gives p-trifluoromethyldihydrocinnamoyl chloride.

This acid chloride in light petroleum is warmed with about 12 g. of anhydrous aluminum chloride until evolution of hydrogen chloride ceases. The mixture is cooled, treated with water and steam distilled. The distillate is saturated with sodium sulfate and the organic layer is separated, washed with sodium carbonate solution and with water and stripped in vacuo to give 6-trifluoromethyl-1-indanone.

This indanone (11 g.) is refluxed with 2 g. of lithium aluminum hydride in 500 ml. of absolute ethanol for 20 minutes. The mixture is diluted with 100 ml. of ether, followed by 50 ml. of water. The organic layer is separated and evaporated to give 6-trifluoromethyl-1-indanol.

A mixture of 9.5 g. of 6-trifluoromethyl-1-indanol and 50 ml. of acetic anhydride is refluxed for two hours. The excess acetic anhydride is removed in vacuo and the residue is diluted with water and extracted with ether. Removal of the solvent in vacuo gives 1-acetoxy-6-trifluoromethylindane.

The above prepared 1-acetoxy-6-trifluoromethylindane is slowly dropped through a column packed with glass helices while maintaining an internal temperature of 460° C. The vapors are collected in a cooled flask. Upon completion of the addition of the acetoxy compound the column is flushed with 5 ml. of anhydrous benzene. The product collected in the flask is diluted with 200 ml. of water and extracted with ether. The extract is washed with sodium carbonate, dried, evaporated and distilled to give 5-trifluoromethylindene.

A mixture of 9.2 g. of 5-trifluoromethylindene and 6.0 g. of ethyl diazoacetate is refluxed for four hours. Distillation furnishes ethyl 1,1a,6,6a-tetrahydro-3-trifluoromethyl-1-cycloprop[a]indenecarboxylate.

Hydrolysis of this ester by refluxing with sodium hydroxide and chlorination by treating with thionyl chloride gives 1,1a,6,6a-tetrahydro-3-trifluoromethyl-1-cycloprop[a]-indenecarbonyl chloride. This acid chloride is treated with sodium azide and the resulting carbonyl azide is heated in toluene to give the corresponding isocyanate.

A mixture of 8.0 g. of the isocyanate is refluxed with 100 ml. of concentrated hydrochloric acid for five hours, then concentrated in vacuo. The residue is dissolved in water, basified and extracted with ether. Evaporation of the extracts gives 1-amino-1,1a,6,6a-tetrahydro-3-trifluoromethylcycloprop[a]indene.

The hydrochloride salt is prepared by treating an ethanol solution of the free base with excess ethereal hydrogen chloride.

Example 19 p-Trifluoromethylaniline (120.0 g.) is added slowly to a mixture of 150 ml. of concentrated hydrochloric acid and 150 g. of crushed ice. A cold solution of sodium nitrite (49.2 g.) in 125 ml. of water is added slowly keeping the temperature below 4° C. The resulting solution is added slowly to 140 g. of potassium ethyl xanthate in 180 ml. of water at 40–45° C. The oily p-trifluoromethylphenyl ethyl xanthate which separates is washed first with 10% sodium hydroxide solution and then with water. The xanthate is dissolved in 95% ethanol. The solution is refluxed with 160 g. of potassium hydroxide for eight hours. The alcohol is removed by distillation. Water is added to the residue and the aqueous mixture is washed with ether. The aqueous mixture is made strongly acid with concentrated sulfuric acid and is then steam distilled. The lower layer is separated and redistilled to obtain p-trifluoromethylthiophenol.

To a mixture of 17.8 g. of p-trifluoromethylthiophenol and 4.0 g. of sodium hydroxide in aqueous solution is added 12.2 g. of ethyl chloroacetate over 30 minutes keeping the temperature at 20–25° C. The reaction mixture is extracted with ether and the extract evaporated and distilled to give ethyl (4-trifluoromethylphenylmercapto)acetate. This ester is hydrolyzed by refluxing in sodium hydroxide solution for five hours, evaporating, dissolving the residue in water, acidifying, extracting with ether and evaporating the solvent in vacuo to give 4-trifluoromethylphenylmercaptoacetic acid. The acid chloride is obtained by treating 15.0 g. of the acid with 50 ml. of thionyl chloride at room temperature for 16 hours. Removal of the excess thionyl chloride in vacuo gives 4-trifluoromethylphenylmercaptoacetyl chloride.

Anhydrous aluminum chloride (15.0 g.) is added to a benzene solution of the above prepared acetyl chloride. The mixture is warmed gently until the evolution of hydrogen chloride ceases. The mixture is cooled, treated cautiously with water and steam distilled. Sodium sulfate is added to the distillate and the organic layer is separated, washed with sodium carbonate solution and with water and evaporated to give 5-trifluoromethyl-3(2H)-thianaphthenone.

A mixture of 10.9 g. of 5-trifluoromethyl-3(2H)-thianaphthenone, 60 ml. of glacial acetic acid and 15 ml. of zinc dust is refluxed with stirring for three hours. The cooled mixture is made alkaline with sodium hydroxide and steam distilled. The distillate is extracted with ether. Concentration of the extract and distillation of the residue gives 5-trifluoromethylthianaphthene.

Refluxing 10.1 g. of 5-trifluoromethylthianaphthene with 6.0 g. of ethyl diazoacetate for four hours and then distilling gives ethyl 1a,6a-dihydro-3-trifluoromethyl-1H-cyclopropa[b]thianaphthene-1-carboxylate. This ester is hydrolyzed by refluxing with sodium hydroxide in aqueous ethanol. The resulting carboxylic acid is treated with thionyl chloride to give 1a,6a-dihydro-3-trifluoromethyl-1H-cyclopropa[b]thianaphthene-1-carbonyl chloride. Reacting this acid chloride with sodium azide and heating the resulting carbonyl azide in toluene at 95° C. for one hour gives the isocyanate.

This isocyanate (6.0 g.) and 75 ml. of concentrated hydrochloric acid are heated at reflux for five hours. Working up as in Example 18 gives 1-amino-1a,6a-dihydro-3-trifluoromethyl-1H-cyclopropa[b]thianaphthene.

A solution of 1.0 g. of the free base in ethyl acetate is added to an ethanol solution of mandelic acid. Concentration and cooling yields the mandelate salt.

*Example 20*

A mixture of 4.6 g. of 1-amino-1a,6a-dihydro-3-trifluoromethyl-1H-cyclopropa[b]thianaphthene, prepared as in Example 19, and 40 ml. of acetaldehyde in ethanol is stirred at room temperature for five hours. The solution is concentrated in vacuo and the residue is hydrogenated with 0.2 g. of palladium-on-charcoal in ethanol solution at 50 p.s.i. for two hours. Filtration and evaporation of the solvent gives, as the residue, 1-ethylamino-1a,6a - dihydro-3-trifluoromethyl-1H-cyclopropa[b]thianaphthene.

*Example 21*

A mixture of 2.3 g. of 1-amino-1a,6a-dihydro-3-trifluoromethyl-1H-cyclopropa[b]thianaphthene, 2.2 g. of ethyl bromide, 2.5 g. of sodium carbonate and 50 ml. of toluene is refluxed for six hours. The cooled mixture is poured into water. The organic layer is concentrated in vacuo to give 1-diethylamino-1a,6a-dihydro-3-trifluoromethyl-1H-cyclopropa[b]thianaphthene. The free base is dissolved in ethanol and treated with excess ethereal hydrogen chloride to give 1-diethylamino-1a,6a-dihydro-3-trifluoromethyl-1H-cyclopropa[b]thianaphthene hydrochloride.

*Example 22*

A mixture of 14.0 g. of 5-fluorosalicylaldehyde, 9.4 g. of chloroacetic acid and 11.2 g. of potassium hydroxide in aqueous ethanol is heated at 160–180° C. for 12 hours. The mixture is then steam distilled. The distillate is extracted with ether and the extract is concentrated and distilled to give 5-fluorobenzofuran.

Refluxing 13.6 g. of 5-fluorobenzofuran with 12.0 g. of ethyl diazoacetate for four hours and then distilling gives ethyl 3-fluoro-1a,6a-dihydro-1H-cyclopropa[b]benzofuran-1-carboxylate.

This ester is hydrolyzed by refluxing with 12 g. of sodium hydroxide in aqueous ethanol for nine hours and the resulting carboxylic acid is treated with thionyl chloride at room temperature to give, after concentrating and distilling, 3-fluoro-1a,6a-dihydro-1H-cyclopropa[b]-benzofuran-1-carbonyl chloride.

An acetone solution of the above prepared acid chloride (10.6 g.) is cooled to 5° C. and treated with 14.0 g. of sodium azide in aqueous solution. The mixture is stirred for 30 minutes at 5–13° C., then poured into ice water and extracted with ether. The extract is concentrated, treated with dry toluene and heated at 90–95° C. for one hour to give, after removal of the solvent, the corresponding isocyanate.

Refluxing 10.0 g. of this isocyanate with 150 ml. of concentrated hydrochloric acid and working up as in Example 1 gives 1-amino-3-fluoro-1a,6a-dihydro-1H-cyclopropa[b]benzofuran.

The free base in ethanol solution is treated with an excess of ethereal hydrogen chloride to give the hydrochloride salt.

*Example 23*

Ethyl diazoacetate (12.0 g.) and 16.6 g. of thianaphthene, 1,1-dioxide are heated at reflux for four hours and the resulting mixture is distilled to give ethyl 1a,6a-dihydro - 6,6-dioxo-1H-cyclopropa[b]thianaphthene-1-carboxylate.

Refluxing the above prepared ester with 20 g. of sodium hydroxide in aqueous ethanol gives the carboxylic acid which is treated with thionyl chloride (30 ml.) to give the acid chloride.

Treatment of this acid chloride with sodium azide as in Example 22 gives the carbonyl azide which is heated in toluene at 95° C. for one hour to furnish the isocyanate.

Heating this isocyanate (4.3 g.) with 60 ml. of hydrochloric acid at reflux for five hours and working up as in Example 1 gives 1-amino-1a,6a-dihydro-6,6-dioxo-1H-cyclopropa[b]thianaphthene.

What is claimed is:
1. A chemical compound of the class consisting of a free base and its nontoxic, pharmaceutically acceptable, acid addition salts, the free base having the following formula:

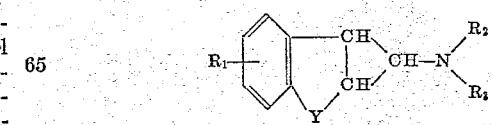

in which Y is a member selected from the group consisting of $CH_2$, O, S and $SO_2$; $R_1$ is a member selected from the group consisting of hydrogen, chloro, bromo, fluoro, trifluoromethyl, methyl and methoxy; and $R_2$ and $R_3$ are members selected from the group consisting of hydrogen, lower alkyl and, when taken together with N, piperidino, N-pyrrolindinyl and morpholino.

2. 1-amino-1,1a,6,6a-tetrahydrocycloprop[a]indene.
3. 1 - amino-1,1a,6,6a-tetrahydrocycloprop[a]-indene hydrochloride.
4. 1-amino - 3 - chloro-1,1a,6,6a-tetrahydrocycloprop[a]indene.
5. 1 - amino-1a,6a-dihydro-1H-cyclopropa[b]-benzofuran.
6. 1-amino-1a,6a-dihydro-1H-cyclopropa[a]thianaphthene.

References Cited in the file of this patent

Badger: Journal of the Chemical Society, (London), 1958, pages 1179–84.